United States Patent [19]

Dunleavy et al.

[11] 4,262,100
[45] Apr. 14, 1981

[54] UNSATURATED POLYESTER MOLDING COMPOSITION

[75] Inventors: Raymond A. Dunleavy; Joseph V. Koleske, both of Charleston, W. Va.

[73] Assignee: Union Carbide Corporation, New York, N.Y.

[21] Appl. No.: 123,044

[22] Filed: Feb. 20, 1980

[51] Int. Cl.³ .................... C08F 283/00; C08F 283/02
[52] U.S. Cl. .............................. 525/445; 260/40 R; 525/438; 525/440; 528/297; 528/300
[58] Field of Search ............... 528/300, 297; 525/438, 525/440, 445; 260/40 R

[56] References Cited

U.S. PATENT DOCUMENTS

| | | | |
|---|---|---|---|
| 3,320,336 | 5/1967 | Duke et al. | 528/299 X |
| 3,375,301 | 3/1968 | Case et al. | 525/445 X |
| 3,719,725 | 3/1973 | Murakami et al. | 525/440 X |
| 3,882,189 | 5/1975 | Mudak | 525/440 X |
| 4,163,114 | 7/1979 | Knopf et al. | 560/185 |
| 4,171,423 | 10/1979 | Smith et al. | 528/289 |

Primary Examiner—Lucille M. Phynes
Attorney, Agent, or Firm—Donald M. Papuga

[57] ABSTRACT

This invention concerns a curable composition comprising a mixture of:

(A) the reaction product of an ester diol alkoxylate of the structural formula:

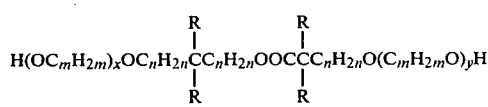

wherein m is an integer having a value of from 2 to 4, preferably 2 or 3; n is an integer having a value of from 1 to 5, preferably 1 to 3 and most preferably 1; x and y are integers each having a value of from 1 to 20, preferably 1 to 10; R is an unsubstituted or substituted, linear or branched alkyl group having from 1 to 8 carbon atoms, preferably 1 to 3 carbon atoms, and an intramolecular anhydride of a polycarboxylic acid; and (B) an ethylenically unsaturated monomer.

This composition can be used in the manufacture of fiber-reinforced plastic compositions.

13 Claims, No Drawings

UNSATURATED POLYESTER MOLDING COMPOSITION

This invention is directed to a polymerizable polyester composition which can be employed in the manufacture of shaped articles, and particularly in the manufacture of fiber-reinforced plastic compositions (FRP).

Conventional polyester resins are solutions of unsaturated polyesters in styrene. The polyesters are typically produced by the condensation polymerization of maleic anhydride or maleic acid with a polyol, typically a diol. The resulting polyester product contains a certain concentration of unsaturation in the backbone of the polymer which is derived from the initial unsaturated acid or its anhydride. Typical commercial polyesters can be as simple as poly(propylene maleate) or as complex as the product from the co-reaction of maleic anhydride or acid, phthalic anhydride and a mixture of diols.

A polyester widely used in automotive applications is made from maleic anhydride and propylene glycol. However, due to the requirements of increased toughness, newer commercial polyesters utilized in automotive applications are frequently more complex in their structure. They are typically derived from the co-reaction of maleic anhydride, isophthalic or terephthalic acids or their esters, and glycols such as propylene glycol, diethylene glycol, dipropylene glycol and/or ethylene glycol. Maleic anhydride or acid is a starting component in these polyesters. During the manufacture of these polyesters, considerable isomerization of the maleate structure into the fumarate form occurs. Thus, most of these resins contain fumarate type double bonds as the predominant source of the unsaturation present in their backbone. The molecular weight (Mn) of these conventional polyesters can range from about 500 to about 5,000. However, most of the commercial polyesters have molecular weights (Mn) of from about 1300 to about 2500.

Fiberglass has been widely used as a reinforcement in the manufacture of thermoset molded articles. These types of articles have been termed "Glass Reinforced Plastics" (GRP) and "Glass Fiber Reinforced Plastics" (GFR). The fiberglass content in these thermoset molded articles ranges from about 15 to about 75-80 weight percent. Polyester resins are used primarily as the resin component in these glass reinforced thermoset plastics.

U.S. Pat. No. 3,320,336, patented May 16, 1967, to Duke et al, describes the manufacture of a conventional polyester in which 2,2-dimethyl-3-hydroxypropyl 2,2-dimethyl-3-hydroxypropionate is utilized as a dihydroxy compound in making the polyester. The polyester is typically produced by direct esterification of a melt of said dihydroxy compound with a bifunctional unsaturated dibasic acid such as maleic acid or anhydride, fumaric acid, phthalic anhydride, isophthalic acid, and tetrahydrophthalic anhydride and the like. The reaction temperatures are above 220° C. The polyesters have molecular weights ranging from 750 to 5000. This reference describes that the proportions of the dihydroxy compound and the unsaturated dibasic acid employed are approximately equimolar and preferably, with a slight molar excess of the dihydroxy compound. The resulting unsaturated polyesters can be blended with one or more monoethylenically unsaturated polymerizable monomers, such as styrene.

The patentee characterizes the polyesters as having improved properties since they can be made at higher temperatures because of the higher boiling point of the dihydroxy compound. Therefore, the residual time for effecting the reaction is shorter, utilizing reaction times "of about from 5–10 hours." The polyesters set forth in U.S. Pat. No. 3,320,336 are characterized as being particularly stable to thermal and oxidative degradation which makes them especially useful in the preparation of fiber glass boat hulls and other materials which require outstanding hydrolytic and oxidative stability.

THE INVENTION

It has now been found that the particular polyester composition of the present invention can form cured polymeric compositions having outstanding properties particularly when utilized in combination with fibers in making fiber reinforce plastic (FRP) compositions. The compositions of this invention have extremely low viscosities which allows them to be utilized in fiber reinforced plastic molding compositions containing large amounts of fiber. FRP employing the compositions of this invention are prepared by injection molding processes, wet lay-up techniques (such as premix and preform molding) and transfer molding procedures. Also, FRP employing the compositions of this invention are utilized in the manufacture of bulk molding compositions which can be molded by injection molding, transfer molding and compression molding procedures, and the like.

Further in contrast to the compositions described in U.S. Pat. No. 3,320,336, the compositions of this invention are produced at much lower temperatures i.e., lower than the 220° C. required by U.S. Pat. No. 3,320,336, and much shorter reaction times. Additionally, the polyesters in the composition of this invention possess lower molecular weights than those of U.S. Pat. No. 3,320,336.

The curable composition of this invention comprises a mixture of:

(A) the reaction product of an ester diol alkoxylate of the structural formula:

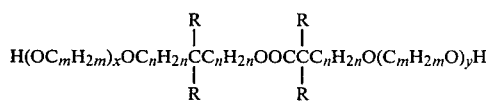

wherein m is an integer having a value of from 2 to 4, preferably 2 or 3; n is an integer having a value of from 1 to 5, preferably 1 to 3 and most preferably 1; x and y are integers each having a value of from 1 to 20, preferably 1 to 10; R is an unsubstituted or substituted, linear or branched alkyl group having from 1 to 8 carbon atoms, preferably 1 to 3 carbon atoms, and an intramolecular anhydride of a polycarboxylic acid; and (B) an ethylenically unsaturated monomer; and (C) can optionally contain a cycloaliphatic epoxide or a mixture of a cycloaliphatic epoxide and an isocyanate.

The compositions of this invention are especially suitable for use in the manufacture of fiber reinforced plastic compositions.

The ester diol alkoxylates of this invention are described in U.S. Pat. No. 4,163,114. These ester diol alkoxylates are produced by the reaction of an ester diol of the structural formula:

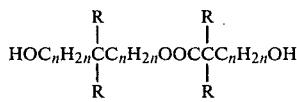

I.

with an oxirane compound, preferably an alkylene oxide, to produce the ester diol alkoxylate of the structural formula:

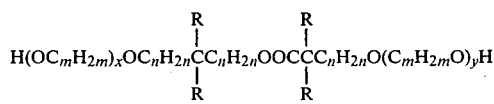

II.

wherein m is an integer having a value of from 2 to 4, preferably 2 or 3; n is an integer having a value of from 1 to 5, preferably 1 to 3 and most preferably 1; x and y are integers each having a value of from 1 to 20, preferably 1 to 10; R is an unsubstituted or substituted, linear or branched alkyl group having from 1 to 8 carbon atoms, preferably 1 to 3 carbon atoms. The substituents on the R group can be any inert group that will not interfere with the reactions involved and can be, for example, cyano, halogen, alkoxyl, nitro, tertiary amine, sulfo, etc. In the formulas, the variables R, m, n, x and y can be the same or different at the various locations.

The ester diol alkoxylates (II) are preferably produced by the catalytic reaction of an ester diol (I) with an alkylene oxide or mixtures of alkylene oxides at an elevated temperature as more fully discussed below. One can manufacture the mono, mixed, blocked or capped adducts.

The reaction of the ester diol with the alkylene oxide is carried out at a temperature of from about 20° to 150° C., preferably from about 50° to 120° C. for a period of time sufficient to complete the reaction between the reactants charged. The temperature is often dependent upon the particular catalyst selected and the alkylene oxide employed. The time will vary depending upon the size of the batch and the particular reactants and catalysts, and the reaction conditions employed.

The reaction can be conducted at subatmospheric, atmospheric or superatmospheric pressure. The pressure is not critical and sufficient pressure is generally used to retain the reactants in the reactor in liquid form.

The amount of alkylene oxide charged to the reaction is from about 2 moles to about 40 moles, or more, per mole of ester diol charged; preferably from 2 to 20 moles.

To minimize oxidative side reactions the reaction is preferably carried out under an inert gas atmosphere using nitrogen, argon or other inert gas.

If desired, an inert solvent such as toluene, benzene or 1,1,1-trichloroethane can be employed. However, the reaction proceeds well in the absence of any such solvent. In most instances a solvent is not required, as the ester diol is itself a liquid at the elevated temperatures employed and serves to maintain a liquid reaction system.

At the conclusion of the reaction the product, consisting of a mixture of the ester diol alkoxylates is recovered as a residue product and can be used as such; distillation procedures can also be used to recover more refined products.

In a typical embodiment, the ester diol and catalyst are charged to a reactor and the alkylene oxide is then added over a period of time, while maintaining the desired temperature and pressure. At the completion of the addition, the contents of the reactor are maintained at the selected conditions until substantially all of the alkylene oxide has reacted. The product can then be purified, if desired, and recovered by conventional procedures. In some instances, one may obtain a product containing other glycols as by-products. This can be minimized by proper selection of reaction conditions and catalyst.

The catalytic reaction of the ester diol alkoxylates of formula II with an intramolecular polycarboxylic acid anhydride produces a derivative that contains free carboxyl groups as described in U.S. Pat. No. 4,171,423. This can be illustrated by the following formula, in which phthalic anhydride is employed for illustrative purposes, that shows the resultant product

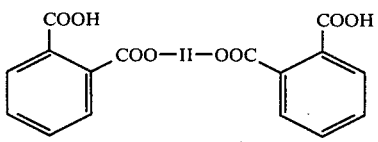

obtained by the reaction of two moles of phthalic anhydride per mole of ester diol alkoxylate II.

Illustrative of suitable polycarboxylic acid anhydrides that can be used one can mention trimellitic anhydride, tetrahydrophthalic anhydride, phthalic anhydride, benzophenone dicarboxylic acid anhydride, succinic anhydride, maleic anhydride, naphthoic anhydride, glutaric anhydride, or any other intramolecular anhydride, including those having substituents thereon such as halogen atoms, alkyl or alkoxy groups, nitro, carboxyl, aryl, or any other group which will not unduly interfere with the reaction. Maleic anhydride is preferred in this invention.

The amount of polycarboxylic acid anhydride reacted with the ester diol alkoxylate II can be an amount sufficient to permit reaction with all of the hydroxy groups. This amount will vary and can be from 0.1 to 1, preferably, from 0.6 to 1.0 anhydride equivalent for each hydroxyl equivalent or group present in the ester diol alkoxylate II initially charged to the reaction mixture. In a most preferred embodiment, from about 0.85 to 0.95 anhydride equivalent for each hydroxy equivalent is present in the initial reaction mixture. This latter amount is most preferred for the following reasons: (1) to insure that excess anhydride is not present if small errors were made in charging a reactor, and (2) to minimize the possibility of solidification of the reaction mass during storage.

In the reaction, a conventional esterification catalyst can be used. These catalysts are well known to those skilled in the art.

The ester diol alkoxylate II is reacted with the polycarboxylic acid anhydride at a temperature of from about 75° to 200° C., preferably from about 100° to 150° C. The time required for reaction will vary depending upon the particular reactants charged, the temperature, and the batch size of the reaction mixture, facts which are well known to those skilled in the art. Generally, it has been found that a reaction period in the laboratory of from 15 to 60 minutes at from 125° to 150° C. is adequate to produce the initial carboxyl-modified addition reaction product obtained by the reaction of these two materials.

Suitable ethylenically unsaturated monomers which may be employed in the practice of this invention are one or more monomers which contain a —CH=C< group, and preferably, a CH$_2$=C< group. These monomers include styrene and its derivatives and homologues, diallyl phthalate, divinylbenzene, acrylic acid or methacrylic acid and their derivatives such as their esters, amides or nitriles, e.g., methyl acrylate, methyl methacrylate, n-butyl methacrylate, acrylamide, methacrylamide, acrylonitrile, methacrylonitrile, and the like. Also, the monomers include vinyl ethers and esters, e.g., vinyl acetate, vinyl propionate, methyl vinyl ether, triallyl cyanurate, 1,3-butanediol dimethacrylate, and the like. Mixtures of the aforementioned monomers may be effectively employed in the practice of this invention.

The most preferred ethylenically unsaturated monomer contemplated in the practice of this invention is styrene. The ethylenically unsaturated monomer is used in amounts of from about 10 to about 90 percent, preferably from about 25 to about 75 percent, and most preferably, from about 30 to about 50 percent, based on the weight of the reaction product (A) and the ethylenically unsaturated monomer.

Cycloaliphatic epoxides may be additionally included in the composition of this invention. The cycloaliphatic epoxides are well known to those skilled in the art and are fully described in U.S. Pat. Nos. 3,027,357; 2,890,194; and 2,890,197. Of particular interest is that portion of U.S. Pat. No. 3,027,357 beginning at column 4, line 11 to column 7, line 38, which portion and disclosure is specifically incorporated herein by reference. Among some of the specific illustrative epoxides disclosed herein one can mention 3,4-epoxycyclohexylmethyl-3,4-epoxycyclohexane carboxylate, bis(3,4-epoxy-6-methylcyclohexylmethyl)adipate, bis(2,3-epoxycyclopentyl)ether, vinyl cyclohexene dioxide, 2-(3,4-epoxycyclohexyl)-5,5-spiro-(2,3-epoxycyclohexane)-m-dioxane, bis(3,4-epoxycyclohexylmethyl)adipate, and the like. The cycloaliphatic diepoxides are preferred.

The amount of epoxide charged to the reaction can vary from about 0.2 mole per mole of ester diol alkoxylate II initially charged to the reaction, to as high as one mole of epoxide per mole of ester diol alkoxylate II. Preferably, the amount of epoxide charged is from about 0.3 to 3.0 mole of epoxide per mole of ester diol alkoxylate II initially charged. Conventional epoxide reaction catalysts are used.

The cycloaliphatic epoxides may be used in combination with an isocyanate. Any of the isocyanates well known in the art can be used alone, or in admixture with other isocyanates, including polyisocyanates. Illustrative thereof one can mention methyl isocyanate, ethyl isocyanate, chloroethyl isocyanate, chloropropyl isocyanate, chlorohexyl isocyanate, chlorobutoxypropyl isocyanate, hexylisocyanate, phenyl isocyanate, the o-, m-, and p-chlorophenyl isocyanates, benzyl isocyanate, naphthyl isocyanate, o-ethylphenyl isocyanate, the dichlorophenyl isocyanates, butyl isocyanates, n-propyl isocyanate, octadecyl isocyanate, 3,5,5-trimethyl-1-isocyanato-3-isocyanatomethylcyclohexane, di(2-isocyanatoethyl)-bicyclo-(2.2.1)-hept-5-ene-2,3-dicarboxylate, 2,4-tolylene diisocyanate, 2,6-tolylene diisocyanate, 4,4'-diphenylmethane diisocyanate, dianisidine diisocyanate, tolidine diisocyanate, hexamethylene diisocyanate, dicyclohexyl-4,-4'-methane diisocyanate, cyclohexane-1,4-diisocyanate, 1,5-naphthylene diisocyanate, 4,4'-diisocyanato diphenyl ether, 2,4,6-triisocyanatotoluene 4,4'-4''-triisocyanato triphenyl methane, diphenylene-4,4-diisocyanate, the polymethylene polyphenylisocyanates as well as any of the other organic isocyanates known to the average skilled chemist.

The amount of isocyanate which can be used is from about 0.1 to about 1.0 equivalent for each epoxide group, preferably from about 0.1 to less than one equivalent for each epoxide group.

The composition of this invention can be cured by azo and peroxide curing agents such as those which are described by Gallagher, et al. "Organic Peroxides Review", Plastics Design & Processing, July, 1978, pages 38–42, and August, 1978, pages 60–67, inclusive. The Technology disclosed in those two articles is incorporated herein by reference. The choice of the specific peroxide or azo initiators for the purpose of curing the composition of this invention is within the purview of those having skill in this art and the manner in which such peroxides and azo initiators operate to effect a desirable cure is generally characterized in the aforementioned articles.

Illustrative of a few such catalysts are 2,2'-azo-bis-isobutyronitrile, dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperoctate, t-butylperneodecanoate, t-butylperbenzoate, t-butylpercrotonate, t-butyl perisobutyrate, di-t-butyl perphthalate, and the like.

The concentration of the curing agent is not critical and can be varied within wide limits. As a representative range, the concentration can vary from about 0.25 to about 5.0 weight percent, preferably from about 0.5 to about 2.5 weight percent, and most preferably, from about 0.75 to about 2.0 weight percent, based on the weight of the reaction product (A) and the ethylenically unsaturated monomer.

In order to avoid premature reaction between the reaction product of the alkoxylate, anhydride and styrene, it is desirable to add polymerization inhibitors to the reaction mixture. These polymerization inhibitors include tertiary butyl catechol, hydroquinone monomethyl or monoethyl ethers, benzoquinone, tertiary-butyl hydroquinone, methyl hydroquinone and mixtures thereof, such as mixtures of hydroquinone monomethyl ether and benzoquinone. These polymerization inhibitors are used in amounts of from about 30 to about 600 parts per million by weight.

If a thickening agent is also employed in the invention, these materials are known in the art, and include the oxides and hydroxides of the metals of Groups I, II and III of the Periodic Table. Specific illustrative examples of thickening agents include magnesium oxide, calcium oxide, zinc oxide, barium oxide, calcium hydroxide, magnesium hydroxide, and mixtures thereof, as well as others known to those skilled in the art. Thickening agents are normally employed in proportions of from about 1.0 to about 6 weight percent, based upon weight of the reaction product (A) and the ethylenically unsaturated monomer.

The composition of this invention may employ a carboxylated vinyl acetate polymer low profile additive. Such polymers include copolymers of vinyl acetate and ethylenically unsaturated carboxylic acids, such as acrylic acid, methacrylic acid, maleic acid, fumaric acid, itaconic acid, and the like; vinyl acetate/vinyl chloride/maleic acid terpolymer, and the like. Reference is made to Comstock et al., U.S. Pat. No. 3,718,714 and Comstock et al. British Pat. No. 1,361,841, or descriptions of carboxylated vinyl acetate polymer low profile additives.

The useful carboxylated vinyl acetate polymer low profile additives ordinarily have molecular weights within the range of from about 10,000 to about 250,000, and preferably from about 25,000 to about 175,000. They are usually employed in proportions of from about 5 to 30, and preferably, from about 10 to 20 weight percent, based on the weight of the reaction product (A) and the ethylenically unsaturated monomer.

As a general rule, the solution polymerized carboxylated vinyl acetate polymers are preferred in commercial practice because of their better batch-to-batch uniformity.

Other thermoplastic polymers useful as low profile additives include homopolymers and copolymers of acrylic and methacrylic acid esters, cellulose acetate butyrate, vinyl acetate homopolymers, polystyrene and styrene copolymerized with acrylates, methacrylates and butadiene, alkylene oxide polymers and copolymers, poly(caprolactones), and saturated-polyesters.

The compositions of this invention can be cured neat or in combination with fillers, pigments, and fibers such as fiberglass, carbon fibers and aromatic polyamide fibers (such as aramid fibers sold by E. I. DuPont Nemours, Wilmington, Delaware under the trademark Kevlar), hollow glass or phenolic resin spheres, and the like.

Mold release agents or lubricants, such as zinc stearate, calcium stearate, and others known to the art may also be used herein.

A method of preparing polymeric material from the compositions of this invention is the bulk molding method which involves mixing the alkoxylate-anhydride reaction product, the ethylenically unsaturated monomer, the curing agent and the vinyl polymerization inhibitor, if used, following which solid additives, such as fillers and pigments, are added and mixed until a substantially homogeneous mixture is obtained. Thereafter, the mixture can be molded by the application of heat and pressure. It is desirable after blending all of the above-mentioned components to allow the mixture to maturate with time to reach the desired molding viscosity, for example, 100 to $10^8$ cps at 25° C. During maturation, measures are usually taken to prevent the loss of volatile materials, e.g. styrene. For example, the mixture can be encapsulated in aluminum foil to prevent evaporation of the volatile materials. In the bulk molding method, the maturated mixture, if desired, can be placed in transfer molding equipment or in injection molding equipment and transfer molded or injection molded in the conventional manner.

Furthermore, the maturated mixture can be employed as a sheet molding compound, for example, by doctoring and overlaying the sheet of mixture with another polyethylene film and cutting the sandwich into the desired shape. Optionally, the fiber, such as glass fiber can be sprinkled onto the mixture sheet prior to overlaying with the second polyethylene film and compressing the resulting sandwich after overlaying the mixture sheet with the second polyurethane film. This latter technique can avoid undue equipment wear by avoiding the need for mixing and handling mixtures containing glass fibers. The sandwich following cutting can be shaped into the desired shape and heated and compressed to cure the mixture into the desired shape.

The compositions of this invention are particularly useful for the manufacture of rigid fiber reinforced molded articles. A preferred procedure for producing a molded article from this composition is described in U.S. Patent Application Ser. No. 035,011 entitled "Molding Process and Apparatus Therefore", and filed on May 1, 1979 in the name of R. Angell, Jr., which is incorporated herein by reference. In this application a process for rapidly fabricating fiber reinforced thermoset resin articles is described. The fiber reinforcement is comprised of one or more fibers with a melting point or a transition temperature above about 130° C. The process comprises the steps of (a) providing in a heatable matched metal die mold, a bonded web of one or more of said fibers, (b) providing in an accumulator zone, a liquid body of a thermosettable organic material having a viscosity determined at 120° C., in the absence of curing agent therefore, of less than about 50 centipoises, and which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom. The fiber reinforcement may be from about 15 to about 80 weight percent of the weight of the molded article which is removed from the mold.

In said U.S. Patent Application Ser. No. 035,011 the apparatus comprises (a) a heatable matched metal die mold containing one or more cavities therein with means for opening said mold to expose said cavities, and means for controlling the injection of a thermosettable organic liquid to said cavities when the mold is closed, (b) means associated with said mold, whereby an interlocked mass of fibers is provided in a portion of the cavity thereof, when the mold is open to receive such cavities and prior to the injection of thermosettable organic liquid to such cavities when the mold is closed, (c) accumulator means associated with said mold which can contain a thermosettable organic liquid transportable to means for controlling injection of said thermosettable liquid to such cavities, (d) cooling means associated with the means for controlling the injection of such liquid to such cavities, whereby the temperature of the liquid in such injection means is maintained substantially below the temperature of the mold.

EXAMPLES

The following Examples serve to illustrate specific embodiments of this invention and it is not intended that the invention be limited by the examples.

In the Examples below, the following materials were used:

Camel Wite—Finely divided calcium carbonate used commercially as a filler in polyesters;
Zinc Stearate—used as a mold release agent;
t-butyl perbenzoate—a peroxide initiator;
t-butyl hydroperoxide—a peroxide initiator; 90 percent active.

JM-308A glass fibers—¼-inch chopped glass fibers, of medium hardness; sold by John Mansville Corp.

Zelec UN—an organophosphate mold release agent sold by E. I. duPont de Nemours.

Lucidol AFR—a suspension of 55 weight percent of benzoyl peroxide in an inert carrier and sold by Lucidol Division of Pennwalt Company.

BP/TCP—a 50/50 mixture of benzoyl peroxide and tricresyl phosphate.

Polyester 2955—a commercial unsaturated polyester resin made by Freeman Chemical Company. It is made from isophthalic acid, maleic anhydride and propylene glycol to a molecular weight of 1000–1500.

Derakane—a vinyl ester resin having a viscosity of about 140 centipoise at 23° C. (manufactured by Dow Chemical Co., Midland, Mich.).

LP-40A—a low profile additive which is a 40 weight percent solids solution of a 99.2/0.8 (by weight) vinyl acetate/acrylic acid copolymer in styrene, having the following properties: Solution Viscosity 4000–6000 centipoises at 25° C. Copolymer Inherent viscosity 0.48; 16-17 Ford cup viscosity. $Mn=42,000$ and $Mw=92,000$.

EXAMPLE 1

To a four-neck reactor equipped with a stirring device, a condenser, a nitrogen inlet, and a thermometer, 190 grams of a 4-mole ethoxylate of 2,2-dimethyl-3-hydroxypropyl-2,2-dimethyl-3-hydroxypropionate and 93 grams of maleic anhydride were added. While stirring, the temperature of the contents was raised to 140° C. and then held at this temperature for 30 minutes to effect reaction of the anhydride with the hydroxyl endgroups of the ethoxylate and thus produce a carboxyl-terminated adduct that contained the unsaturation associated with maleic anhydride. The contents of the reactor were cooled to 100° C. and placed into a storage container as a residue product. The residue product which was clear and of light amber color, had a Brookfield viscosity of 13,360 centipoise at 22° C. and an acid number of 187.5.

EXAMPLE 2

The procedure of Example 1 was repeated except that 150 grams of a 2.2-mole ethoxylate of 2,2-dimethyl-3-hydroxypropyl-2,2-dimethyl-3-hydroxypropionate and 93 grams of maleic anhydride were added to the flask. The residue product produced was clear and of light amber color, had a Brookfield viscosity of 68,240 centipoise at 22° C. and an acid number of 216.

EXAMPLES 3-4

The ingredients and parts by weight thereof as shown in Table I, as well as Control A, which was Derakane polyester resin, were weighed into a container, blended, aspirated to remove air, and then cast between two glass plates. The cast system was heated to 60° C. for two hours to gel the system and then post-cured to effect crosslinking by heating at 125° C. for 3 hours. The plaques so formed were allowed to age about 24 hours under ambient conditions prior to testing.

TABLE I

| Component | Example 3 | Example 4 | Control A |
|---|---|---|---|
| Example 1 | 42 | — | — |
| Example 2 | — | 42 | — |

TABLE I-continued

| Component | Example 3 | Example 4 | Control A |
|---|---|---|---|
| Derakane | — | — | 42 |
| Styrene | 48 | 48 | 48 |
| LP-A-40 | 16 | 16 | 16 |
| BP/TCP | 2 | 2 | 2 |

ASTM test specimens were cut from the castings and tested for tensile modulus, tensile strength, and elongation according to ASTM D-638, Type IV die; notched izod impact according to ASTM D-256, Method A; and tensile work to break, which is the energy required to break an ASTM D-638 Type IV dumbbell specimen (cross head rate 0.05 inches/minute at a temperature of 75° F.) and normalized for the cross-sectional area of the dumbbell specimen. This was estimated by measuring the area under the tensile force-deflection curve and dividing the measured energy by the initial cross-sectional area in the area of rupture of the dumbbell specimen.

The results are shown in Table II.

TABLE II

| Properties | Example 3 | Example 4 | Control A |
|---|---|---|---|
| Tensile modulus, psi $\times 10^5$ | 4 | 4 | 5 |
| Tensile strength, psi | 9000 | 8000 | 5000 |
| Elongation, percent | 2.8 | 2.2 | 1.1 |
| Notched izod impact ft. lbs./in. | 0.2 | 0.2 | 0.2 |
| Tensile work to break in. lbs./in.$^2$ | 15,800 | 10,700 | 1,243 |

The results show that tougher castings are produced from the resin composition of this invention in comparison with a commercial polyester resin, as evidenced by the tensile strength, elongation and tensile work to break.

EXAMPLES 5 AND 6

The ingredients and parts by weight thereof as shown in Table III, as well as Control B, which was Polyester 2955, were prepared into Bulk Molding Compound (BMC) formulations and molded by the following procedures:

The liquid components were weighed individually into a Hobart mixing pan placed on a Toledo balance. The t-butyl perbenzoate was weighed into a vial and added to the contents of the pan and the pan was attached to a Model C-100 Hobart mixer (in a hood). The agitator was started at slow speed, then increased to medium speed to completely mix the liquids over a period of 3 to 5 minutes. The agitator was then stopped, and the zinc stearate was added to the liquid from an ice cream carton. The Hobart mixer was restarted and the zinc stearate mixed with the liquid until it was completely wet-out. The Camel Wite was next added to the pan contents (agitator off) then mixed, using medium to high speed, until a consistent paste was obtained. The mixer was stopped and magnesium oxide added and then mixed. The mixer was again stopped and 75 grams of the paste was removed from the pan (using a large spatula) and transferred to a wide-mouthed 4-ounce bottle. This paste sample was stored in a capped bottle at room temperature and the viscosity was measured periodically using a Model HBT Brookfield Viscometer on a Helipath Stand.

After removal of the paste sample, the chopped glass fibers were added slowly (from an ice cream carton) to the pan with the mixer running on low speed. The mixer was run for 30 seconds after all the glass was in the paste. This short time gave glass wet-out without glass degradation. The pan was then removed from the mixer and separate portions of the BMC mix of 550 grams each were removed, using spatulas, and transferred to aluminum foil lying on a balance pan (balance in the hood). The mix was tightly wrapped in the aluminum foil (to prevent loss of styrene via evaporation) and stored at room temperature until the viscosity of the retained paste sample reached a desired value. The mixes in this study usually reached this viscosity within 24 hours of their preparation.

The general procedure for molding the samples of BMC was the following:

The equipment used for compression molding of $12 \times 12 \times \frac{1}{8}$ inch plaques from the glass reinforced unsaturated polyester molding mixes was a 75-ton Queen's hydraulic press fitted with a $12 \times 12$ inch matched metal die mold (chromed surface). The dies were heated to 150° C., and the 550 gram portion of mix was removed from the foil and placed in the mold. The mold was quickly closed (without stops) to a pressure of 500 psi, and the plaque was cured for 3 minutes at 500 psi/150° C. The mold was opened, the plaque was quickly removed, and allowed to cool.

TABLE III

| Component | Example 5 | 6 | Control B |
|---|---|---|---|
| Example 1 | 40 | — | — |
| Example 2 | — | 40 | — |
| Polyester 2955 | — | — | 40 |
| LP-40-A | 35 | 35 | 35 |
| Styrene | 25 | 25 | 25 |
| Camel Wite | 150 | 150 | 150 |
| Zinc Stearate | 4 | 4 | 4 |
| TBPB | 1.5 | 1.5 | 1.5 |
| Magnesium Oxide | 3 | 3 | 3 |
| JM 308A Glass Fiber | 46 | 46 | 46 |

The plaques, as molded above, were tested for the following properties: tensile modulus and tensile strength, elongation, izod impact and tensile work to break by the procedures as described in Examples 3 and 4 above, and for shrink (the difference between the dimension of the mold and the dimension of the final part removed from the mold and held at ambient conditions for about 24 hours).

The results are shown in Table IV.

TABLE IV

| Example | Modulus, psi ($\times 10^{-6}$) | Tensile Strength psi ($\times 10^{-6}$) | Elongation % | Izod Impact (ft.-lbs./in.) | Shrink (mil./in.) |
|---|---|---|---|---|---|
| 5 | 1.2 | 5 | 0.5 | 5 | 1.6 |
| 6 | 1.6 | 6 | 0.5 | 3 | 3.8 |
| Control B | 1.5 | 6 | 0.4 | 5 | 1.3 |

EXAMPLE 7

A 4-necked, 2 liter flask fitted with a paddle stirrer, a nitrogen inlet and outlet, a thermometer with a Therm-O-Watch controller, and a heating mantle was charged with 760.0 g (2.0 moles) of the 4 mole ethoxylate of 2,2-dimethyl-3-hydroxypropyl 2,2-dimethyl-3-hydroxypropionate and 392.2 g (about 4.0 moles) of maleic anhydride. The mixture was warmed to 140° C. and maintained at that temperature by application of a cooling bath until the reaction exotherm subsided, and then heated for an additional hour at 140° C. To the mixture was added 0.34 g of hydroquinone inhibitor and the mixture was cooled to room temperature for transfer to a jar for storage. The acid number of the resin was 190 mg KOH/g (determined in a pyridine/methanol mixed solvent).

EXAMPLES 8 AND 9

The castings produced in these Examples 8 and 9 do not contain low-profile additives in the formulation.

The resin formulations and amounts thereof, in grams, as shown in Table V, were poured between two glass plates separated by a $\frac{1}{8}$ inch thick neoprene gasket. The solution was heated for 16 hours at 85° C., followed by heating for 6 hours at 120° C. A hard, clear, rigid casting results.

TABLE V

| Component | Example 8 | 9 |
|---|---|---|
| Example 7 | 66 | 66 |
| Styrene | 45 | 36 |
| Zelec UN | 0.6 | 0.6 |
| t-butyl hydroperoxide | 1.2 | 1.2 |

ASTM test specimens were cut from the castings and tested for tensile strength, tensile modulus, and elongation according to ASTM D-638, Type IV die, and flexural strength and modulus according to ASTM D-790.

The results are shown in Table VI.

TABLE VI

| Properties | Example 8 | 9 |
|---|---|---|
| Tensile strength, psi ($\times 10^3$) | 8.1 | 6.7 |
| Tensile modulus, psi ($\times 10^6$) | 0.39 | 0.33 |
| Elongation, % | 8.8 | 5.6 |
| Flexural strength, psi ($\times 10^3$) | 13.7 | 10.6 |
| Flexural modulus, psi ($\times 10^6$) | 0.42 | 0.41 |

The data in Table VI show that the compositions of this invention produce castings having an excellent balance of mechanical properties.

EXAMPLE 10

Example 10 shows the preparation of a composition from a formulation which does not contain filler nor a low profile additive.

The resin formulation was as follows:
82.5 g of Example 7;
67.5 g of styrene;
0.90 g of Zelec UN; and
2.9 g of Lucidol AFR The solution was used to impregnate 5 plies of PPG type AKM chopped strand mat (from PPG Industries, Pittsburgh, Pa.) in a $\frac{1}{8} \times 8 \times 8$ inch cavity mold using a hand lay-up technique. The glass weighed 90.2 g. The mold was then closed and transferred to a heated press. After a cure cycle of 5 minutes at 120° C. followed by 5 minutes at 150° C., the composite was removed from the mold. It was hard, rigid, and translucent. The composite weighed 168.8 g.

ASTM test specimens were cut from the composite and tested for tensile strength and modulus, elongation, and flexural strength and modulus by the procedures as described in Examples 8 and 9.

The results are shown in Table VII.

TABLE VII

|  | Example 10 |
|---|---|
| Styrene content (wt.% of resin) | 45 |
| Glass content (wt.%) | 53 |
| Tensile strength (psi $\times 10^3$) | 20.7 |
| Tensile modulus (psi $\times 10^6$) | 1.10 |
| Elongation (%) | 2.1 |
| Flexural strength (psi $\times 10^3$) | 26.0 |
| Flexural modulus (psi $\times 10^3$) | 1.22 |

What is claimed is:

1. A curable composition comprising a mixture of:
(A) the reaction product of an ester diol alkoxylate of the structural formula:

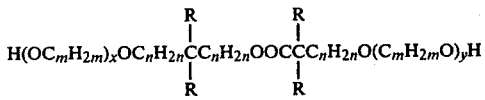

wherein m is an integer having a value of from 2 to 4, n is an integer having a value of from 1 to 5, x and y are integers each having a value of from 1 to 20, R is an unsubstituted or substituted, linear or branched alkyl group having from 1 to 8 carbon atoms, and an intramolecular anhydride of a polycarboxylic acid; and
(B) an ethylenically unsaturated monomer.

2. A composition as defined in claim 1 wherein in the ester diol alkoxylate, m has a value of 2 to 3, n has a value of 1 to 3, x and y each have values of from 1 to 10, and R is an unsubstituted or substituted linear or branched alkyl group having from 1 to 8 carbon atoms.

3. A composition as defined in claim 2 wherein n has a value of 1 and R is a methyl group.

4. A composition as defined in claim 1 wherein the anhydride is maleic anhydride.

5. A composition as defined in claim 1 wherein (A) contains from 0.1 to 1 anhydride equivalent for each hydroxyl group in the ester diol alkoxylate.

6. A composition as defined in claim 5 wherein (A) contains from 0.6 to 1 anhydride equivalent for each hydroxyl group in the ester diol alkoxylate.

7. A composition as defined in claim 6 wherein (A) contains from about 0.85 to 0.95 anhydride equivalents for each hydroxyl group in the ester diol alkoxylate.

8. A composition as defined in claim 1 which contains a cycloaliphatic epoxide.

9. A composition as defined in claim 1 which contains a mixture of a cycloaliphatic epoxide and an isocyanate.

10. A composition as defined in claim 1 wherein the ethylenically unsaturated monomer is styrene.

11. A cured molded article prepared from the composition of claim 1.

12. A cured molded article as in claim 11 wherein the molded article contains from about 15 to about 80 weight percent, of the weight of the molded article, of one or more fibers with a melting point or a glass transition temperature above about 130° C.

13. A cured molded article as defined in claim 11 wherein the fiber is fiberglass.

* * * * *